(12) United States Patent
Robb et al.

(10) Patent No.: US 7,807,308 B2
(45) Date of Patent: Oct. 5, 2010

(54) FUEL CELL SYSTEM AND START-UP METHOD

(75) Inventors: Gary M. Robb, Honeoye Falls, NY (US); Balasubramanian Lakshmanan, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 291 days.

(21) Appl. No.: 11/858,974

(22) Filed: Sep. 21, 2007

(65) Prior Publication Data

US 2009/0081496 A1 Mar. 26, 2009

(51) Int. Cl.
*H01M 8/04* (2006.01)

(52) U.S. Cl. ............. 429/446; 429/443; 429/428; 429/429; 429/456; 429/50

(58) Field of Classification Search .......... 429/13, 429/14, 25
See application file for complete search history.

(56) References Cited

U.S. PATENT DOCUMENTS

| | | | |
|---|---|---|---|
| 6,913,845 B2 * | 7/2005 | Bekkedahl et al. | 429/18 |
| 2005/0118487 A1 | 6/2005 | Whiton et al. | |
| 2005/0129999 A1 | 6/2005 | Geschwindt et al. | |
| 2006/0240302 A1 * | 10/2006 | Senner et al. | 429/32 |
| 2007/0224463 A1 * | 9/2007 | Morita | 429/12 |
| 2009/0226783 A1 * | 9/2009 | Hasegawa | 429/25 |

FOREIGN PATENT DOCUMENTS

| JP | 2003243007 | * | 8/2003 |
|---|---|---|---|
| WO | WO 2007/013453 A1 | | 2/2007 |

* cited by examiner

*Primary Examiner*—Patrick Ryan
*Assistant Examiner*—Ladan Mohaddes
(74) *Attorney, Agent, or Firm*—Fraser Clemens Martin & Miller LLC; J. Douglas Miller

(57) ABSTRACT

A fuel cell system including a fuel cell stack having a plurality of fuel cells is provided. An anode supply manifold and an anode exhaust manifold are in fluid communication with the anodes of the plurality of fuel cells. A first valve is in fluid communication with the anode supply manifold and a second valve is in fluid communication with the anode exhaust manifold. A pressure sensor is adapted to measure an anode pressure. In operation, the first valve and the second valve are controlled in response to the anode pressure, thereby militating against an undesired exhausting of an anode supply stream.

5 Claims, 4 Drawing Sheets

US 7,807,308 B2

FUEL CELL SYSTEM AND START-UP METHOD

FIELD OF THE INVENTION

The present disclosure relates to a fuel cell system and, more particularly, to a method for starting the fuel cell system.

BACKGROUND OF THE INVENTION

A fuel cell has been proposed as a clean, efficient and environmentally responsible power source for electric vehicles and various other applications. In particular, the fuel cell has been identified as a potential alternative for a traditional internal-combustion engine used in modern vehicles.

A common type of fuel cell is known as a proton exchange membrane (PEM) fuel cell. The PEM fuel cell includes three basic components: a cathode, an anode and an electrolyte membrane. The cathode and anode typically include a finely divided catalyst, such as platinum, supported on carbon particles and mixed with an ionomer. The electrolyte membrane is sandwiched between the cathode and the anode to form a membrane-electrode-assembly (MEA). The MEA is often disposed between porous diffusion media (DM) which facilitate a delivery of gaseous reactants, typically hydrogen and oxygen from air, for an electrochemical fuel cell reaction. Individual fuel cells can be stacked together in series to form a fuel cell stack. The fuel cell stack is capable of generating a quantity of electricity sufficient to power a vehicle.

During periods of non-operation, a quantity of air diffuses into and accumulates in the anodes of the fuel cell stack. Upon start-up of the fuel cell stack, hydrogen is supplied to the anodes. The hydrogen displaces the air and creates a "hydrogen-air front" that passes over the anodes. The hydrogen-air front is known to degrade carbon in the electrodes and impact fuel cell performance. In particular, the presence of both hydrogen and air on the anode results in a localized electrical short between a portion of the anode that sees hydrogen and a portion of the anode that sees air. The localized electrical short causes a cell reversal, resulting in a rapid corrosion of the catalyst support. The rate of carbon corrosion has been found to be proportional to a time that the hydrogen-air front exists and a magnitude of the localized voltage at the hydrogen-air front.

It is known in the art to rapidly purge the anodes of the accumulated air with hydrogen and minimize the time that the hydrogen-air front exists on the anodes. The purge is often designed to substantially and evenly fill the anode inlet header with hydrogen without exhausting an excess of hydrogen from the fuel cell system. An illustrative purge method is disclosed in applicant's co-pending U.S. application Ser. No. 11/762,845, incorporated herein by reference in its entirety. Typically, a time required to purge the anodes is calculated in advance, based on the volume of the fuel cell stack and the flow rate of the hydrogen. However, the quantity of air that has accumulated on the anodes varies with different shut-down periods and conditions. Additionally, variations in pressure, pressure measurements, flow rates, flow control and composition of the gases on the anodes after shut-down periods may vary widely. Therefore, the time required to displace the accumulated air from the anodes, as well as the volume and flow rate of hydrogen for purging the anodes, is generally not optimized. As the optimal end point of the purge is often difficult to predict, systems of the art have been unable to fully purge the anodes with hydrogen without exhausting an undesirable quantity of hydrogen to the atmosphere.

Known systems have also employed a dead-short circuit method during start-up of the fuel cell stack. In dead-short systems, a circuit with a shorting resistor, for example, is used to minimize the localized voltage during start-up of the fuel cell stack. The rate of carbon corrosion during start-up of the fuel cell stack is thereby minimized. In order for the dead-short system to work properly, however, each fuel cell in the fuel cell stack must have substantially equal quantities of hydrogen for the duration of the dead-short. A fuel cell that is deficient in hydrogen may experience undesirable, localized conditions if subjected to the dead-short.

There is a continuing need for a fuel cell system and method that provides a rapid and reliable start-up. Desirably, the fuel cell system and method militates against an excessive exhaust of hydrogen during start-up, enables the employment of a dead-short method to minimize carbon corrosion, and militates against undesirable effects to the fuel cell stack resulting from the dead-short circuit.

SUMMARY OF THE INVENTION

In concordance with the instant disclosure, a fuel cell system and method that provides desirable fuel cell system emissions, optimizes the hydrogen-air front time during the start-up, and enables the employment of a dead-short circuit for minimization of carbon corrosion, is surprisingly discovered.

In one embodiment, a fuel cell system is provided. The fuel cell system includes a fuel cell stack having a plurality of fuel cells, and an anode supply manifold in fluid communication with the anodes of the plurality of fuel cells. The anode supply manifold is adapted to deliver an anode supply stream to the plurality of fuel cells. The fuel cell system further includes an anode exhaust manifold in fluid communication with the anodes of the plurality of fuel cells and adapted to receive an anode exhaust stream from the plurality of fuel cells. A pressure sensor is in communication with the fuel cell stack and adapted to measure an anode pressure. The fuel cell system has a first and second valve in fluid communication with the anode supply and exhaust manifolds, respectively. The first and second valves are adapted to operate at a predetermined anode pressure measured by the pressure sensor.

In another embodiment, a method for starting the fuel cell system is provided. The method first includes the steps of providing the first valve in one of an open position and a closed position, and providing the second valve in a closed position. An anode supply stream is supplied to the anode supply manifold. The first valve is then opened, if it is not already provided in an open position, and a first quantity of air from the anode supply manifold is exhausted therethrough. An anode pressure is monitored while the first quantity of air is exhausted. The first valve is closed when the anode pressure indicates a flow of the anode supply stream therethrough, for example, when the anode pressure is less than a predetermined pressure value. The second valve is then opened and a second quantity of air is exhausted from the anode exhaust manifold through the second valve until the anode supply stream flows through the second valve.

In a further embodiment, a flow-rate of the anode supply stream is at least one of controlled and measured during the step of supplying the anode supply stream. The method may further include the steps of measuring a pressure differential across the first valve, and calculating an anode pressure from the pressure differential and the flow rate of the anode supply stream. The first valve is then closed when the anode pressure is less than a predetermined pressure value.

The method of the disclosure may further include a step of activating a dead-short when the second valve is opened. An average voltage of the fuel cell stack is maintained at substantially zero. After filling the anodes with the anode supply stream, the dead-short of the fuel cell stack may be deactivated and a cathode supply stream supplied to a cathode inlet manifold. The start-up of the fuel cell system is thereby completed.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
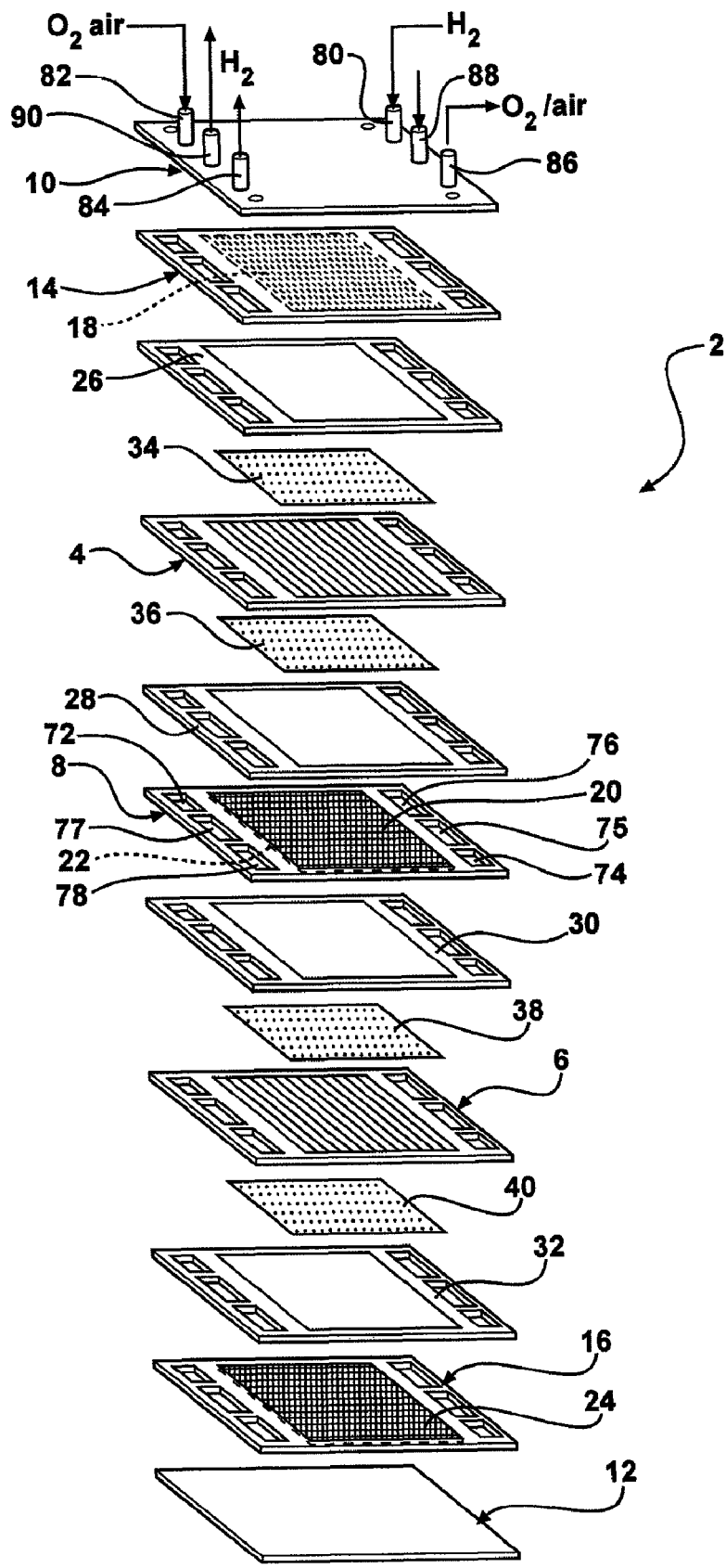
FIG. 1 illustrates a schematic, exploded perspective view of a PEM fuel cell stack (only two cells shown)

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIG. 1 depicts a bipolar PEM fuel cell stack 2 having a pair of MEAs 4, 6 separated from each other by an electrically conductive bipolar plate 8. For simplicity, only a two-cell stack (i.e. one bipolar plate) is illustrated and described in FIG. 1, it being understood that a typical fuel cell stack will have many more such cells and bipolar plates. The MEAs 4, 6 and bipolar plate 8 are stacked together between a pair of clamping plates 10, 12 and a pair of unipolar end plates 14, 16. The clamping plates 10, 12 are electrically insulated from the end plates 14, 16 by a gasket or a dielectric coating (not shown). The unipolar end plates 14, 16, as well as both working faces of the bipolar plate 8, include flowfields 18, 20, 22, 24 for distributing a hydrogen gas and air over an anode and a cathode, respectively, of the MEAs 4, 6. Nonconductive gaskets 26, 28, 30, 32 provide seals and an electrical insulation between the several components of the fuel cell stack 2. Gas-permeable diffusion media 34, 36, 38, 40 are adjacent the electrodes, such as the anodes and the cathodes, of the MEAs 4, 6. The end plates 14, 16 are disposed adjacent to the diffusion media 34, 40, respectively, while the bipolar plate 8 is disposed adjacent to the diffusion media 36 on the anode face of MEA 4. The bipolar plate 8 is further disposed adjacent to the diffusion media 38 on the cathode face of MEA 6.

The illustrative two-cell, bipolar PEM fuel cell stack 2 further includes a cathode supply manifold 72 and a cathode exhaust manifold 74, a coolant supply manifold 75 and a coolant exhaust manifold 77, and an anode supply manifold 76 and an anode exhaust manifold 78. The hydrogen gas is supplied to the anode supply manifold 76 via an anode inlet conduit 80. The air is supplied to the cathode supply manifold 72 of the fuel cell stack 2 via a cathode inlet conduit 82. An anode outlet conduit 84 and a cathode outlet conduit 86 are also provided for the anode exhaust manifold 78 and the cathode exhaust manifold 74, respectively. A coolant inlet conduit 88 and a coolant outlet conduit 90 are further provided for supplying liquid coolant to, and removing coolant from, respectively, the coolant inlet manifold 75 and the coolant outlet manifold 77. It should be understood that the configurations of the various inlets 80, 82, 88 and outlets 84, 86, 90 in FIG. 1 are for the purpose of illustration, and other configurations may be chosen as desired.

Figure 2:
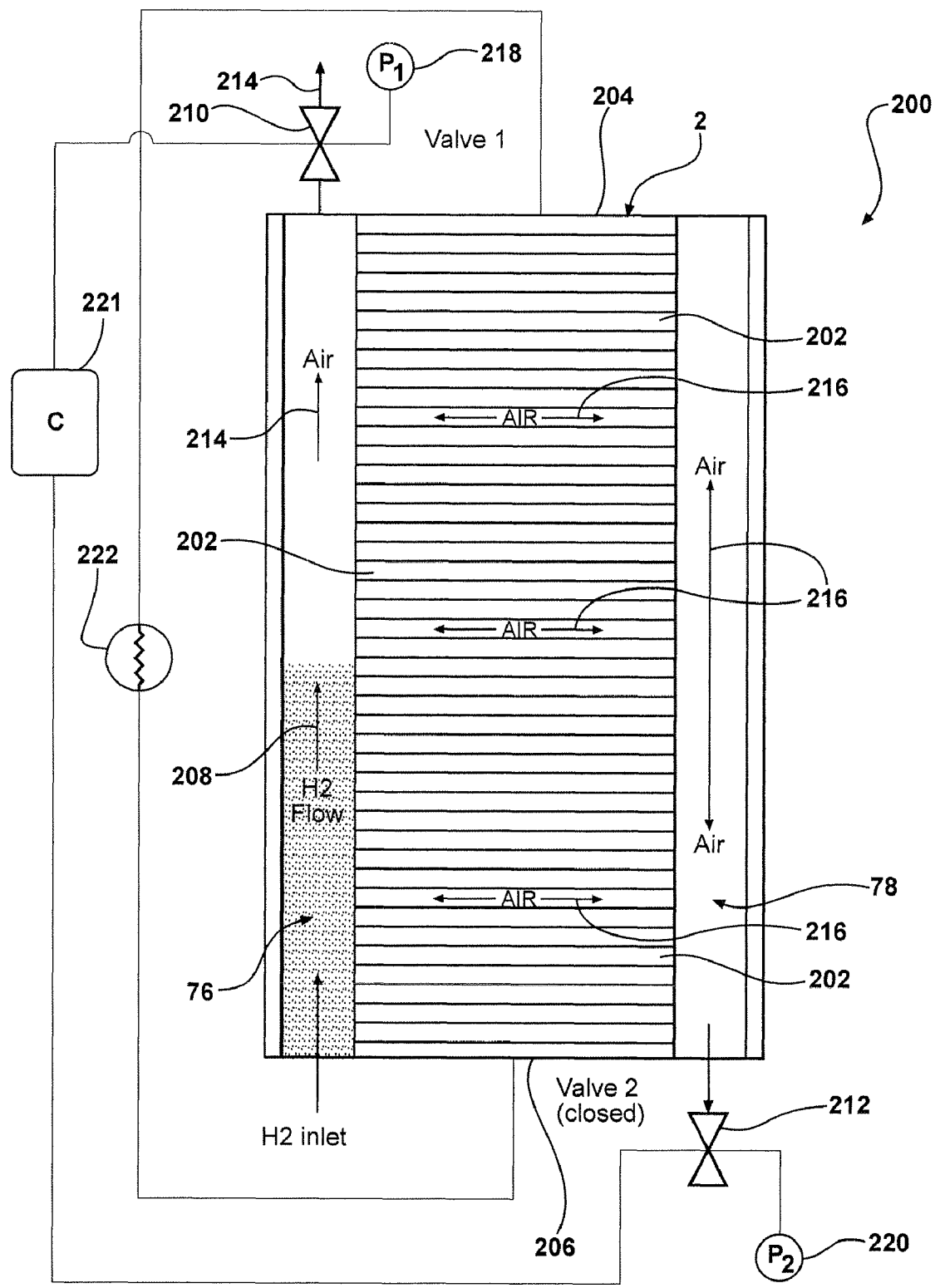
FIG. 2 is a side cross-sectional view of a fuel cell system according to an embodiment of the present disclosure.

FIG. 2 shows a fuel cell system 200 according to an embodiment of the invention. The fuel cell system 200 includes the fuel cell stack 2 having a plurality of fuel cells 202. Each of the plurality of fuel cells 202 has an anode and a cathode with an electrolyte membrane disposed therebetween. The fuel cell stack 2 further has a first end 204 and a second end 206. In particular embodiments, the first end 204 is known as the "dry end" and the second end 206 is known as the "wet end."

The fuel cell system 200 includes the anode supply manifold 76 in communication with the anodes of the plurality of fuel cells 202. The anode supply manifold 76 is adapted to deliver an anode supply stream 208, such as gaseous hydrogen, to the plurality of fuel cells 202. The fuel cell system 200 further includes an anode exhaust manifold 78 in communication with the anodes of the plurality of fuel cells 202. The anode exhaust manifold 78 is adapted to receive an anode exhaust stream, such as residual gaseous hydrogen, air, and water, from the plurality of fuel cells 202.

The fuel cell system 200 further includes a first valve 210 in fluid communication with the anode supply manifold 76. A second valve 212 is in fluid communication with the anode exhaust manifold 78. In one embodiment, the first valve 210 is disposed at the first end 204 of the fuel cell stack 2. The second valve 212 may be disposed at the second end 206 of the fuel cell stack 2. The first valve 210 is adapted to exhaust a first quantity of air 214 and the anode supply stream 208 from the anode supply manifold 76. The second valve 212 is adapted to exhaust a second quantity of air 216 and an anode exhaust stream from the anode exhaust manifold 78. In a further embodiment, the second valve 212 is disposed at the first end 204 instead of the second end 206.

It should be appreciated that when a sufficient period of time has elapsed between a shutdown operation of the fuel cell system 200 and a start-up operation, the first and second quantities of air 214, 216 will accumulate in the anode supply and exhaust manifolds 76, 78. Further, it should be appreciated that the first and second quantities of air 214, 216 will accumulate, during a sufficient period of stack inoperability, on the anodes of the plurality of fuel cells 202.

In a particularly illustrative embodiment, the fuel cell system 200 includes at least one pressure sensor adapted to measure a pressure of the anodes of the plurality of fuel cells 202. In one embodiment, the first valve 210 is in communication with a first pressure sensor 218. The second valve 212 may also be in communication with a second pressure sensor 220. As a nonlimiting example, at least one of the pressure sensors 218, 220 is a differential pressure sensor or ΔP sensor. Differential pressure sensors are known to accurately measure a pressure drop across a fixed orifice, such as the first and second valves 210, 212. Thus, the ambient pressure being assumed or otherwise known, the pressure of the anodes of the plurality of fuel cells 202 may be readily determined with the ΔP sensor. In particular embodiments, at least one of the pressure sensor 218, 220 is integral with at least one of the first and second valves 210, 212, respectively. One of ordinary skill in the art should also understand that suitable pressure sensors disposed at other locations within the fuel cell system 200 and adapted to measure the pressure of the anodes may be used as desired.

In operation, the first valve 210 may be adapted to open or close at a first predetermined anode pressure. The first predetermined anode pressure may be measured by at least one of the pressure sensors 218, 220. The second valve 212 may be adapted to open or close at a second predetermined anode pressure measured by at least one of the pressure sensors 218, 220. Other suitable pressure sensors adapted to measure the anode pressure may be used as desired. A skilled artisan should also appreciate that the first and second predetermined anode pressures may be selected as desired. In a particular embodiment, the first and second predetermined anode pressures may be selected to indicate when at least one of the anode supply manifold 76, the anode exhaust manifold 78, and the anodes are substantially filled with hydrogen from the anode supply stream 208.

The fuel cell system 200 also may include a controller 221. The controller 221 is adapted to actuate the first valve 210 and the second valve 212, thereby opening or closing the first valve 210 and the second valve 212 as desired. For example, the controller 221 may receive a signal from the at least one pressure sensor 218, 220 indicating that the anode supply manifold 76 has a sufficient quantity of hydrogen present to begin filling the anodes. It should therefore be understood that the pressure of the anodes may be used to determine a composition of the gas in the anode supply manifold 76. The composition of the gas in the anode supply manifold 76 may be determined, for example, by calculation from the flow rate of the anode supply stream 208 and the pressure drop across at least one of the first and second valves 210, 212. The controller 221 may be adapted to actuate the first and second valves 210, 212 in response to a pressure-determinant composition of gas or gases in the anode supply manifold 76.

The fuel cell system 200 of the present disclosure may further have at least one resistive device 222 in electrical communication with the fuel cell stack 2. The resistive device 222 is adapted to provide a resistive load to the fuel cell stack 2, and short the fuel cell stack 2 as desired. In particular embodiments, the resistive device 222 is a high-voltage bus coupled to an electrical sink. The resistive device 222 may have a minimal electrical resistance and form a dead-short circuit that connects the end plates 14, 16 of the fuel cell stack 2. In other embodiments, the resistive device 222 is a resistor in electrical communication with the fuel cell stack 2. The resistive device 222 may be adjustable to provide a desired resistive load on the fuel cell stack 2. In an illustrative embodiment, the resistive device 222 is adapted to place a resistive load on the fuel cell stack 2 during startup, thereby limiting cell potential and militating against fuel cell degradation induced by carbon corrosion. A skilled artisan should understand that other suitable resistive devices 222 may be used as desired.

In a further embodiment, the fuel cell system 200 includes a compressor (not shown) in communication with the cathode inlet manifold 78. The compressor is adapted to supply a cathode supply stream, such as air, to the cathode inlet manifold 72. The cathode inlet manifold 72 is in fluid communication with the cathodes of the plurality of fuel cells 202. In a particular embodiment, the fuel cell system 200 includes a bypass valve and a bypass conduit in fluid communication with the compressor. The bypass valve and conduit are adapted, for example, to allow the cathode supply stream to bypass the fuel cell stack 2 as desired. For example, it should be appreciated that the bypass conduit may be in fluid communication with the first valve 210 and the second valve 212 for dilution of hydrogen exhausted via the valves 210, 212.

Figure 3:
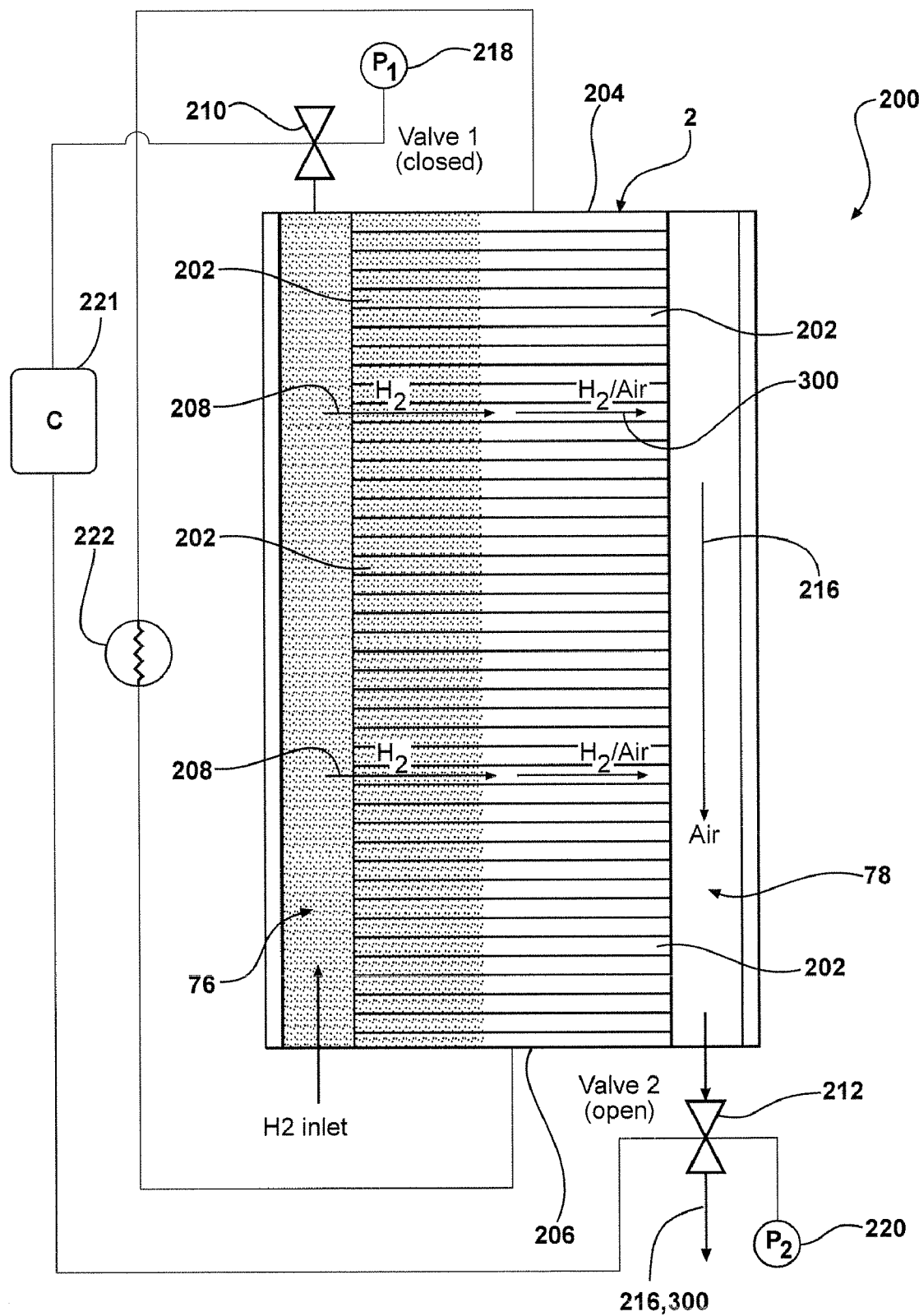
FIG. 3 is a side cross-sectional view of the fuel cell system depicted in FIG. 2, the fuel cell system uniformly distributing an anode supply stream to individual fuel cells.
Figure 4:
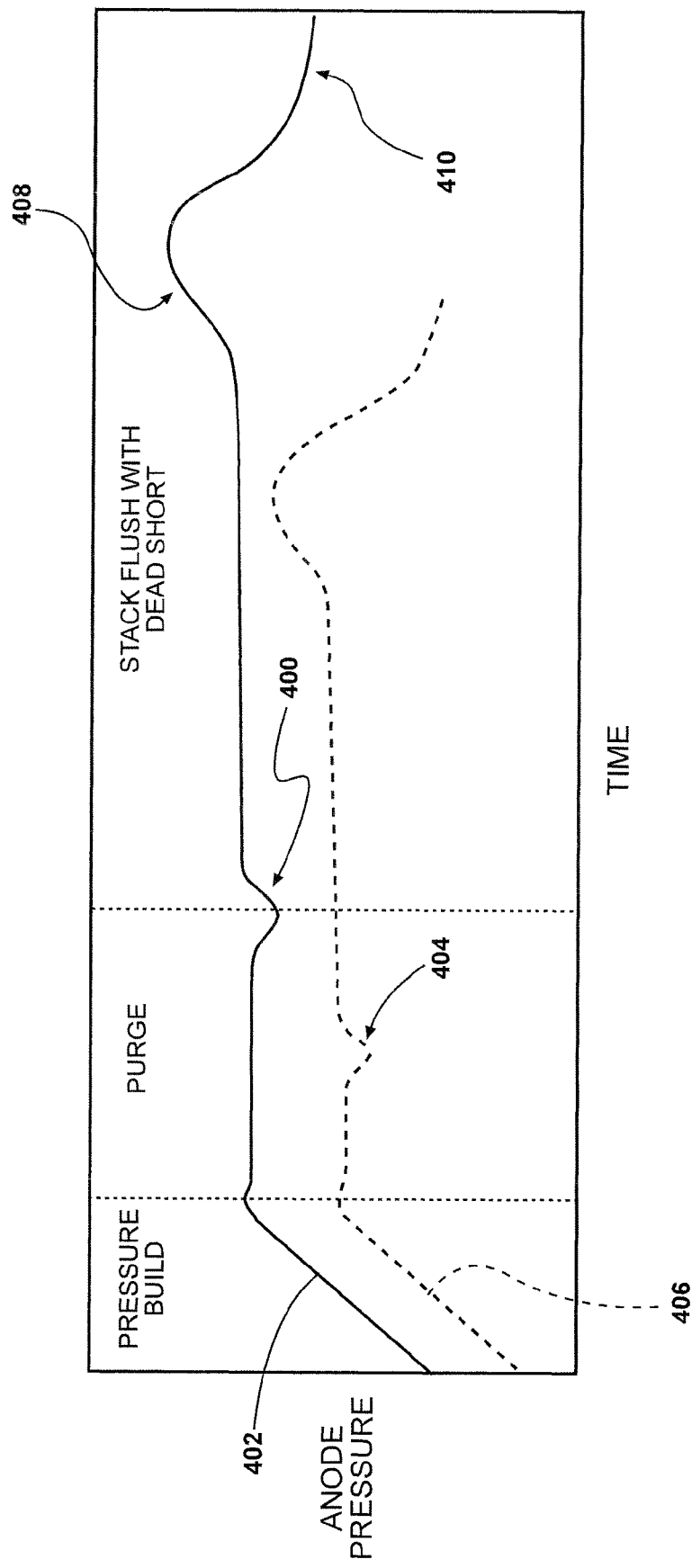
FIG. 4 is an exemplary graph depicting an absolute anode pressure during a start-up of a fuel cell system according to one embodiment of the disclosure.

As shown in FIGS. 3 and 4, the present disclosure includes a method for starting the fuel cell system 200. The method includes steps of providing the first valve 210 in at least one of an open position and a closed position, and the second valve 212 in a closed position. The first valve 210 is opened, if not provided in the open position, prior to a step of supplying the anode supply stream 208 to the anode supply manifold 76. The anode supply stream 208 may be a compressed hydrogen gas, for example. A flow rate of the anode supply stream 208 may be at least one of controlled and measured while the anode supply stream 208 is supplied.

It should be appreciated that the step of opening the first valve 210 may be preceded by a pressure build step in which the first valve 210 remains closed for a desired period of time. In the pressure build step, pressure is increased within the anode supply manifold 76 to a level sufficient to force a first quantity of accumulated air 214 into the compressible volume of the anodes without forcing a substantial quantity of the anode supply stream 208 into the anodes. When a desired pressure is achieved, the first valve 210 may then be opened.

Upon opening the first valve 210, the first quantity of air 214 accumulated during the shut-down of the fuel cell system 200 is exhausted through the first valve by a pressure of the anode supply stream 208. If the volume of the plurality of fuel cells 202 is pressurized in the pressure build step, the anode supply stream 208 is caused to flow out of the first valve 210, thereby completely filling the anode supply manifold 76. The step of exhausting the first quantity of air 214 is known as a "purge step" or "header purge step."

The first valve 210 is closed when the anode supply manifold 76 is substantially filled with the anode supply stream 208. For example, the first valve 210 may be closed in response to a signal from the controller 221, to which the anode pressure measurements are provided. The first and second valves 210, 212 may be opened or closed in when the anode pressure reaches a predetermined pressure value, for example. In one embodiment, the first valve 210 is operated at a first predetermined pressure value. The second valve 212 may be operated at a second predetermined pressure value. The first and second predetermined pressure values may be substantially the same. Thus, the first and second valves 210, 212 may be operated substantially simultaneously in response to the predetermined pressure value. It should be appreciated that pressure measurements may be employed as desired to operate the first and second valves 210, 212, thereby selectively supplying gaseous reactants to the fuel cell stack 2.

During the purge step, while the first quantity of air 214 is being exhausted from the anode supply manifold 76, a pressure of the anodes of the plurality of fuel cells 202 is monitored. As described herein, the pressure of the anodes may be monitored with a pressure sensor. Individual anodes may be monitored with pressure sensors disposed in the fuel cell system 200, for example. In one embodiment, the pressure of the anodes is monitored by at least one of the first pressure sensor 218 and the second pressure sensor 220. The pressures of the anode supply manifold 76, the anode exhaust manifold 78, and anodes may also be monitored by other suitable pressure sensors, as desired.

In a particular embodiment, the anode pressure is monitored by measuring a pressure of the anode supply manifold 76. The anode supply manifold 76 pressure may be monitored with a ΔP sensor, for example. When at least one of the first pressure sensor 218 and the second pressure sensor 220 is a ΔP sensor, the step of monitoring the anode pressure includes the step of measuring a pressure differential across at least one of the first and second valves 210, 212. In a particularly illustrative embodiment, the anode pressure is monitored by measuring a pressure differential across the first valve 210.

At closure of the first valve 210, the second valve 212 is opened and a second quantity of air 216 is caused to flow from the anodes and the anode exhaust manifold 78 through the second valve 212. The flow of the second quantity of air 216 from the anodes is commonly referred to as a "stack flush step" or "flush step." The steps of closing the first valve 210 and opening the second valve 212 may be performed substantially simultaneously.

It should be appreciated that the anode supply stream 208 of the present method is supplied substantially uniformly to the plurality of fuel cells 202 during the flush step. The purging of the anode supply manifold 76 with the anode supply stream 208 prior to the stack flush facilitates the substantially uniform supply and distribution of the anode supply stream 208 to the anodes. The purge step fills the anode supply manifold 76. The substantially uniform supply and distribution then begins, for example, when the first valve 210 is closed and the second valve 212 is opened.

The steps of closing and opening the first and second valves 210, 212, respectively, may be performed when the anode pressure reaches the predetermined pressure value. The predetermined pressure value employed to control the valves 210, 212 may be selected as desired. The anode pressure may be calculated from the pressure differential measured across at least one of the first and second valves 210, 212, and the flow rate of the anode supply stream 208. A change in the anode pressure during the stack purge and flush steps may be indicative of a volume, such as one of the anode supply and exhaust manifolds 76, 78, having been substantially filled with hydrogen gas. Thus, the predetermined pressure value may be selected so that the steps of closing and opening the first and second valves 210, 212 occurs when hydrogen has substantially filled at least one of the anode supply manifold 76, the anode exhaust manifold 78, and the anodes themselves.

As shown in FIG. 4, the predetermined pressure value may be selected as indicative of the anode supply stream 208 having substantially filled the anode supply manifold 76. For example, a first decrease 400 in a monitored anode pressure 402 during the purge step has been observed to be indicative of the anode supply stream 208 flowing through the first valve 210 instead of accumulated air 214. Similarly, in the fuel cell system 200 where the anode has some residual hydrogen remaining therein after shut-down, a similar decrease 404 in a monitored anode pressure 406 is observed to occur earlier than when no residual hydrogen is present. Accordingly, a skilled artisan should appreciate that the monitored anode pressure may be indicative of the composition of the gases within the anode supply manifold 76 of the fuel cell stack 2.

As a nonlimiting example, the anode supply manifold 76 may be filled with air following a shut-down period. A 30 kPa pressure drop may be initially observed across the first valve 210 at an anode supply stream 208 flow rate of about 10 L/s When the anode supply manifold 76 is substantially filled with hydrogen from the anode supply stream 208, however, the pressure drop decreases to about 5 to about 6 kPa, for example. The pressure drop across the first valve 210 is thereby indicative of the composition of the gas in the anode supply manifold 76. It should be understood that these figures are for the purpose of example only, and that other pressure drop values and flow rates may be observed, depending on the fuel cell system 200 and methods employed.

As further depicted in FIG. 4, as the anode supply stream 208 moves across the anodes, and the hydrogen in the anode supply stream reacts with oxygen from residual air on the cathodes, the dynamic pressure on the anodes therefore remains substantially constant. When all of the residual oxygen on the cathodes has been consumed, an increase 408 in the monitored anode pressure 402 may occur. The increase 408 is indicative of hydrogen from the anode supply stream 208 displacing the accumulated air 216 on the anodes. After reaching a local maximum, a second decrease 410 in the monitored anode pressure 402 may be observed. The second decrease 410 is indicative of the anodes having been substantially filled with hydrogen. A skilled artisan should therefore appreciate that the monitoring of the anode pressure may be employed to determine when to begin supplying the cathode supply stream to the cathode inlet manifold of the fuel cell system 200. In one embodiment, the anode pressure may be monitored at the second valve 212, for example with a pressure sensor such as a ΔP sensor.

The method of the present disclosure may further include the step of activating a dead-short circuit of the fuel cell stack 2, for example, when the first valve 210 is closed and the second valve 212 is opened. The activation of the dead-short circuit is adapted to maintain an average voltage of the fuel cell stack 2 at substantially zero volts. The dead-short circuit is effective in minimizing an occurrence of undesirable localized voltages and therefore carbon corrosion, when the anodes are flushed with the anode supply stream 208.

In one embodiment, the method of the disclosure includes the step of deactivating the dead-short of the fuel cell stack 2, for example, after the anodes are substantially filled with the anode supply stream 208. Following the deactivation of the dead-short, the method may then include the step of supplying the cathode supply stream to the cathode inlet manifold. It should be appreciated that the dead-short is not engaged when the cathode supply stream is supplied to the fuel cell stack 2 in order to militate against degradation of the fuel cell stack 2. However, the fuel cell stack 2 may be subject to a minimal parasitic load as the cathodes of the fuel cell stack 2 fill with air. The minimal parasitic load may be selected as desired and is adapted to minimize the voltage of the fuel cell stack 2 as the fuel cell system 200 air compressor is started. The employment of a minimal parasitic load may militate against undesirable open-circuit voltage events during the start-up operation of the fuel cell stack 2.

As the cathode supply stream fills the cathodes, about one or two cathode volumes typically pass through the fuel cell stack 2 before the fuel cell system 200 is fully operational and prepared to receive a full electrical load. A fitness of the fuel cell stack 2 to receive the full load may be determined, for example, by measuring an average fuel cell voltage. In another embodiment, the fitness of the fuel cell stack 2 to receive the full load may be determined by measuring a minimum cell voltage, for example.

It is surprisingly found with the fuel cell system 200 and method of the disclosure that undesirable exhausting of hydrogen during the start-up operation of the fuel cell stack 2 is minimized. In particular, the measurement of the anode pressure and employment of the anode pressure in controlling actuation of the first and second valves 210, 212 is now shown to be effective in limiting exhaust of hydrogen from the anode supply stream 208. Additionally, the measurement of the anode pressure surprisingly enables the employment of the dead-short circuit of the fuel cell stack 2 during the start-up by reliably providing each fuel cell 202 with the anode supply stream 208 for the duration of the dead-short. A degradation of the fuel cell stack 2 via carbon corrosion or, for example, due to a formation of localized conditions within the fuel cell stack 2 during the dead-short, are thereby militated against with the system and method of the present disclosure.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for starting a fuel cell system including a fuel cell stack having a plurality of fuel cells, each of the plurality of fuel cells having an anode and a cathode with an electrolyte membrane disposed therebetween, the fuel cell stack having an anode supply manifold and an anode exhaust manifold in communication with the anodes of the plurality of fuel cells, the method comprising the steps of:

providing a first valve in one of an open position and a closed position, the first valve in fluid communication with the anode supply manifold;

providing a second valve in a closed position, the second valve in fluid communication with the anode exhaust manifold;

supplying an anode supply stream to the anode supply manifold;

opening the first valve if the first valve is provided in the closed position;

exhausting a first quantity of air from the anode supply manifold through the first valve;

monitoring an anode pressure by measuring a pressure differential across at least one of the first valve and the second valve;

closing the first valve when the anode pressure is less than a predetermined pressure value;

opening the second valve;

activating a dead-short when the second valve is opened, wherein an average voltage of the fuel cell stack is maintained at substantially zero;

exhausting a second quantity of air from the anode exhaust manifold through the second valve;

deactivating the dead-short of the fuel cell stack; and supplying a cathode supply stream to a cathode inlet manifold in fluid communication with the plurality of fuel cells after supplying the anode supply stream to the anodes.

2. The method of claim 1, wherein a pressure buildup occurs in the anode supply manifold between the steps of supplying the anode supply stream and opening the first valve.

3. The method of claim 1, wherein the predetermined pressure value is indicative of the anode supply stream having substantially filled the anode supply manifold.

4. The method of claim 1, wherein the first valve is closed and the second valve is opened substantially simultaneously.

5. The method of claim 1, further comprising the step of: subjecting the fuel cell stack to a minimal load while supplying the cathode supply stream, wherein open circuit voltage events are militated against.

* * * * *